June 23, 1970          C. HEDREI          3,516,458
GUIDES FOR TWIN BLADE SAWS
Filed April 22, 1968          2 Sheets-Sheet 1
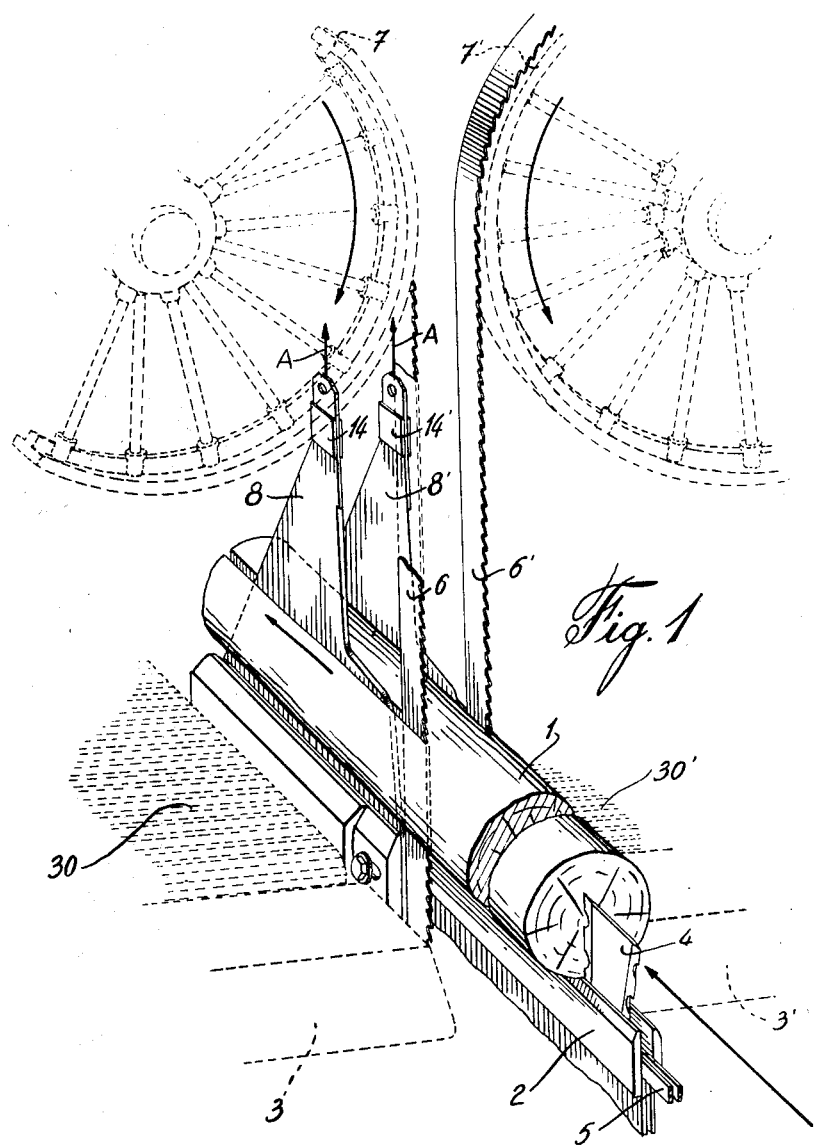
INVENTOR
Constantin HEDREI
ATTORNEY

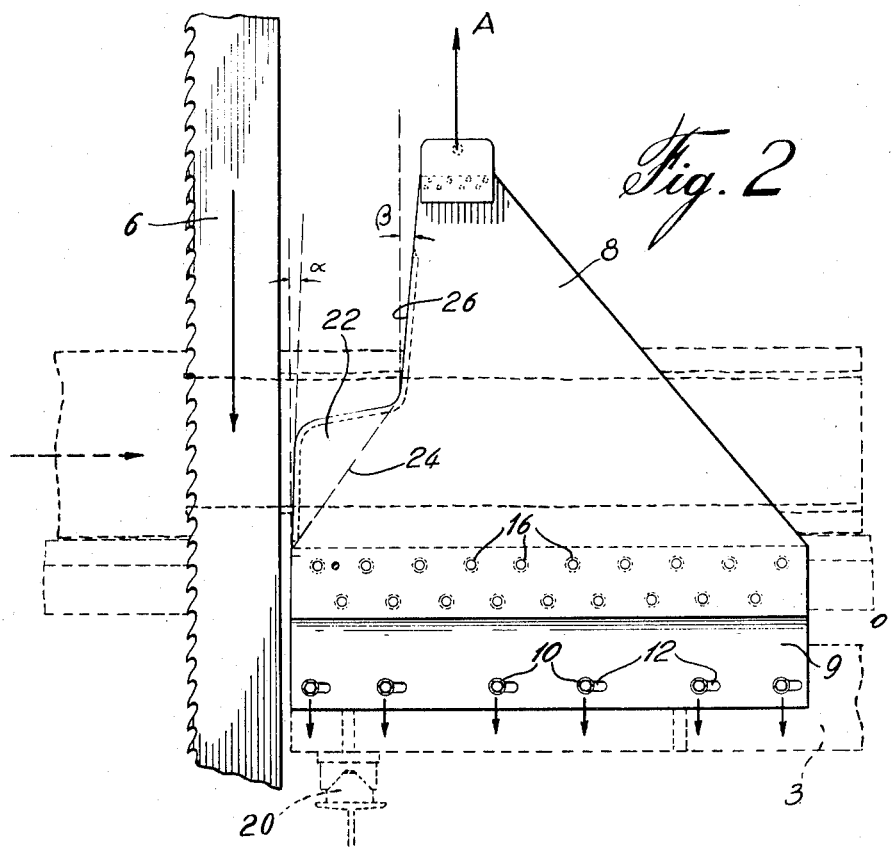
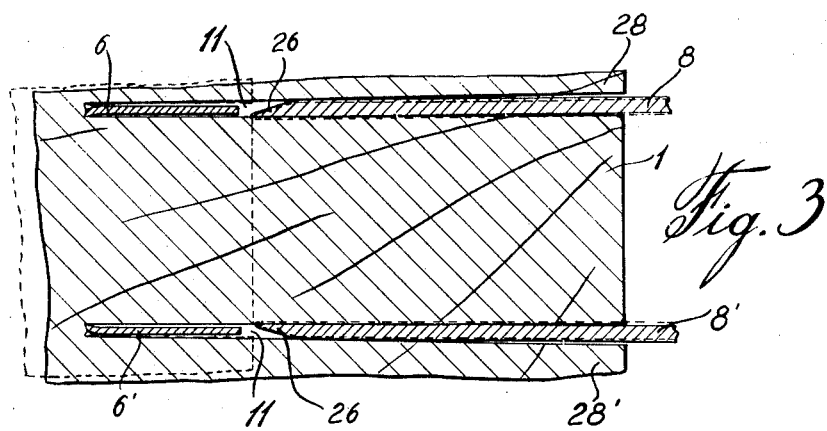

United States Patent Office 3,516,458
Patented June 23, 1970

3,516,458
GUIDES FOR TWIN BLADE SAWS
Constantin Hedrei, Montreal, Ouest, Quebec, Canada, assignor to Forano Limitee, Plessisville, Quebec, Canada
Filed Apr. 22, 1968, Ser. No. 722,837
Int. Cl. B27b *15/04, 15/08*
U.S. Cl. 143—22                                              9 Claims

ABSTRACT OF THE DISCLOSURE

A solid plate is mounted behind each saw of twin blade saws so as to follow in the kerf thereof, the said plates being under a stretchable tension in a plane perpendicular to the plane of the kerf.

BACKGROUND OF THE INVENTION

Field of the invention

The present application is directed to twin band saws and in particular to a guiding device for logs, cants and the like, cut by twin band saws so as to prevent the rotation and any side movements in plane, perpendicular to saw blades of the logs and the like.

Description of the prior art

Disc or band saws are known to cut blocks or logs or cants in two steps, that is, the log is first cut on one side and then the face which has been cut is applied against a flat surface and the second cut is performed in a plane parallel to the first cut.

SUMMARY OF THE INVENTION

One object of the invention is to perform in one operation the double sliding of a log on two parallel faces.

Another object of the invention is to prevent the rotation and any side movements of the log while it is cut on two parallel faces.

A further object of the invention is to use band saws instead of disc saws, the latter being usually thicker than the former.

In order to achieve the desired objects, guides are used with twin band saws to produce straight and parallel cuts on both sides of logs or cants, the said guides comprise guiding plates adapted to be mounted behind and in the plane of each saw blade, that is, in the kerf thereof and means for stretchably tensioning the plates in a direction parallel to the movement of the saws, that is, perpendicular to the direction of the movement of the log.

BRIEF DESCRIPTION OF THE DRAWING

FIG. 1 is a perspective view of a twin band saw arrangement including the guiding plates according to the invention;

FIG. 2 is a side view of the saw blade followed by the guiding plates;

FIG. 3 is a cross-sectional view taken through the log being cut by the twin saws and followed by the guiding plates.

DESCRIPTION OF THE PREFERRED EMBODIMENT

A log 1 is mounted on tracks 2 between two sliding frames 3 and 3'. The log 1 is pushed by a knife-type flight 4 fixed to a movable chain 5 located between the tracks 2. The sliding frames 3 and 3' carry the band saws 6 and 6' and the rotating wheels 7 and 7' which actuate the band saws 6 and 6'. In addition, the frames 3 and 3' carry the plates 8 and 8' which are fixed at their lower end to a thick plate 9 by means of screws 16 and the holding plates 9 are slidably mounted to the frames 3 and 3' by means of bolts 10 passing through slots 12 provided in the thick plate 9. The upper part of the plates 8 and 8' is slidably sandwiched between dovetailed reinforcing plates 14 and 14' and these reinforcing plates are connected to a stretchably straining device mounted on the frames 3 and 3'. A screw and lever type stretching device would be considered appropriate.

The rotating wheels 7 and 7', the band saws 6 and 6', the plates 8 and 8' and the stretchable tensioning means pulling in the direction of the arrows A and A' are respectively mounted on the frames 3 and 3' which may slide laterally in order to provide a variable distance between the two blades 6 and 6' and the plates 8 and 8'. The distance which may be automatically controlled, determines with precision the thickness of the block or slab to be cut through the log 1. The tracks 2 on which the log 1 travels are mounted in a symmetrical location between the two frames 3 and 3' and the knife 4 which is fixed to the chain conveyor 5 is wedged into the end of the log 1 and pushes the latter against the cutting edge of the two saw blades 6 and 6'. The knife 4 is not sufficient to prevent the log from rotating or moving sideways especially when the log is crooked, irregular or knotty.

The purport of the invention consists in mounting two plates 8 and 8' directly behind the saw blades 6 and 6' in the plane of the kerfs 11. The guiding plates 8 and 8' are screwed at the bottom to a thick plate 9 with screws 16 and the thick plate 9 is slidably mounted to the frame 3 with screws 10 sliding in the slots 12 provided in the thick plate 9. As shown in FIG. 2, the frame 3 is mounted to slide over rails 20.

The plate is vertically stretched by an upward pulling action in the direction of the arrow A but the projecting nose 22 constituting the leading edge of the blade 6 is substantially free of the tension exerted throughout the plate because the said tension appears mainly below and rearwardly of the line 24. The absence of tension in the leading edge 22 permits a small lateral movement of the said nose so as to lead itself when entering into the kerfs of the blades 6 and 6'.

Furthermore, the front edge 26 of the plate 8 is tapered so as to facilitate the penetration of the plates into the kerfs behind the blade 6. These plates are preferably made of heat-treated steel and the tension applied on them is of the order of 6,000 pounds. The plates 8 and 8' are slightly thicker than the kerf of blades 6 and 6' and keep the main body of the log 1 tightened behind the blade 6 so as to prevent the rotation and sideways movement of the log. Furthermore, the lateral slabs 28 and 28' of the logs are pushed outwardly so as to make them fall on the slab conveyors 30 and 30'.

FIG. 3 illustrates the wedge action of the plate 8 wherein the kerfs widens as the plates 8 and 8' penetrate thereinto.

The front edges of the projecting nose 22 and the tensioned front-part of the plate are upwardly and rearwardly inclined in order to compensate for the pulling-down action of the saw on the log. It is well known that the log will be pushed downwardly against the track 2 by the downward movement of the blade 6 and in order to slightly compensate for this pulling action, the front edge of the nose 22 as well as the front edge of the plate 8 thereabove are slightly receding rearwardly to form an angle $\alpha$ and $\beta$ respectively and will then cause an upward action against the log.

The stretching action of the two plates 8 and 8' in the direction of the arrows A and A' is produced by means of two distinct tensioning devices even if the tensioning on each side is the same.

The fact that the plates 8 and 8' are thicker than the blades 6 and 6' constitute an additional advantage. Every person who has used a saw has experienced the tightening effect of the two sides of the kerf on the saw blade. By wedging the kerf behind the saw blade, this tightening effect will be eliminated on the saw blade.

Due to the fact that after each sharpening the width of saw blades 6 and 6' will be changed from a wider to a narrower blade, the plates 8 and 8' may accordingly be slightly moved forwardly or rearwardly due to the provisions of the slots 12, in order to maintain in each case, the desired narrow gap between the guide-plates and saw-blades. When all the bolts 10 have been tightened, the stretchable tension is increased in the direction of the arrows A and this tension may vary for different reasons and in particular for the size of the logs or cants to be cut. Heat-treated steel is preferably used for plates 8 and 8' because the stretchable tension exerted on the said plates may be very high.

Many modifications may be foreseen in the construction of this device without departing from the spirit of the invention.

I claim:

1. A wood cutting machine comprising:
   two straight and parallel band saws to produce straight and parallel cuts along two sides of a log or cant,
   a guide plate mounted behind and in the plane of each saw blade, the said plate being spaced from said band saws,
   a supporting track located between each plate and each band saw and parallel thereto for holding the log,
   log transporting means movable along the track for pushing the log at one end towards the saw bands,
   means for stretchably tensioning each plate in a direction parallel to the movement of each saw.

2. Guides as recited in claim 1, wherein each plate is stretched by independent tensioning means.

3. A wood cutting machine as recited in claim 1, wherein the log transporting means comprises a wedge member adapted to penetrate into one end of the log for preventing sideways movement thereof and rotation of the log.

4. A wood cutting machine as recited in claim 1, wherein each guide plate has a projecting nose integral with the guide plate and extending towards the band saw beyond the tensioned portion of the plate, the said nose being at the level of the log to be cut.

5. Guides as recited in claim 1, wherein the thickness of each plate is greater than the thickness of the blades for relieving the pressure of the log upon the blades.

6. Guides as recited in claim 4, wherein the forward edge of the plates is tapered to facilitate the penetration of the plates into the kerfs.

7. Guides as recited in claim 4, wherein the leading edge of the strain free portion and the tensioned portion of the plate have an upward and rearward inclination so as to compensate for the pulling action of the blades on the logs.

8. A wood cutting machine as recited in claim 1, comprising means to vary the spacing between the blades and the plates.

9. In a wood cutting machine having a pair of band saws for making straight parallel cuts along two sides of a log or cant, and a log carrying means for moving the log across the saw bands along a plane parallel and intermediate thereof, the improvement comprising:
   a guide plate mounted behind and in the plane of each saw blade, the said plate being spaced from said band saw,
   means for stretchably tensioning each plate in a direction parallel to the movement of each saw,
   a projecting nose integral with the guide plate and extending towards the band saw beyond the tensioned portion of the plate,
   whereby the said projecting nose is free to slightly move laterally so as to lead the guide plate into the kerfs produced in the log by the saw blades.

References Cited

UNITED STATES PATENTS

| 259,661 | 6/1882 | Bowker. | |
| 552,614 | 1/1896 | Hutchinson | 143—22 |
| 1,920,584 | 8/1933 | Osterberg | 143—159.15 |
| 3,352,186 | 11/1967 | Cleland | 83—201.15 |

FOREIGN PATENTS

| 31,110 | 7/1911 | Sweden. |

DONALD R. SCHRAN, Primary Examiner

U.S. Cl. X.R.

143—160, 159.15